UNITED STATES PATENT OFFICE.

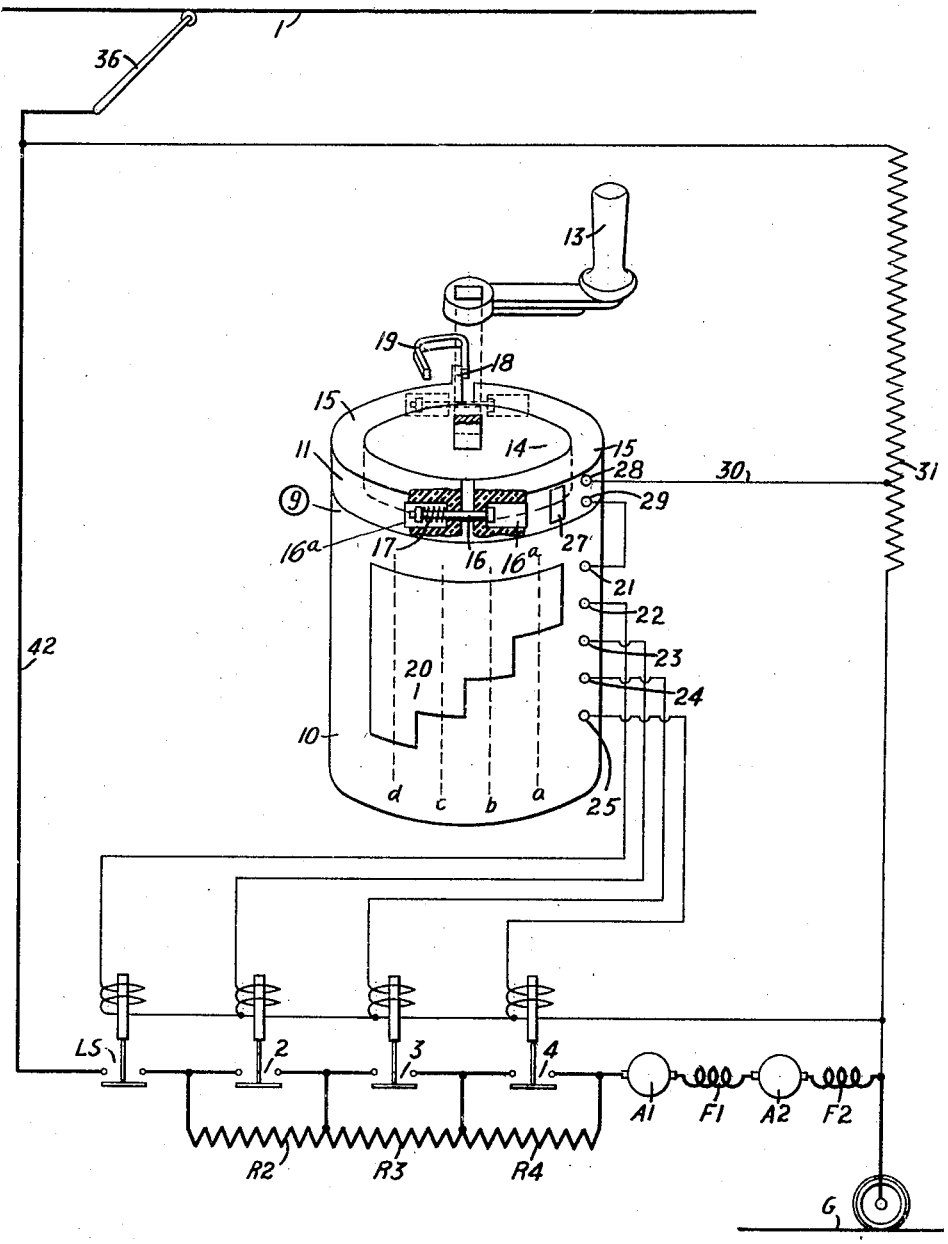

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,336,596.  Specification of Letters Patent.  Patented Apr. 13, 1920.

Original application filed June 18, 1913, Serial No. 774,394. Divided and this application filed September 27, 1916. Serial No. 122,444.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Apparatus, of which the following is a specification, this application being a division of my copending application Serial No. 774,394, filed June 18, 1913, which has matured into Patent No. 1,239,840, granted September 11, 1917.

My invention relates to controllers for governing the operation of electric motors and particularly to controllers that are adapted for use with railway vehicles employing a plurality of independent unit switches and a master controller.

The object of my invention is to provide a controller of the above-indicated character which shall embody simple and effective means for concurrently interrupting the energized circuits for a plurality of unit switches when the controller is moved backwardly a predetermined amount.

Master controllers are usually arranged to complete the energizing circuits for several unit switches in a predetermined sequence, when moved in a forward direction, in order to properly govern the motors during the period of acceleration and are adapted to interrupt the energizing circuits in the reverse order when moved backwardly to their "off" positions.

My invention proposes the use of a master controller that is provided with an auxiliary disk which has frictional engagement with the main controller drum and which is adapted, by means of suitable stops, to have the movement thereof restricted to a predetermined amount, preferably corresponding to a single notch on the controller, whereby the main control circuit is completed for the first position of the master controller, and remains so during the remaining forward movements of the controller, but which is interrupted when the controller is moved in a reverse direction.

The single figure of the accompanying drawing is a perspective view of a controller embodying my invention and a diagrammatic view of an arrangement of control circuits adapted to be governed by the controller.

Referring to the drawing, a supply-circuit conductor 1 and a return-circuit conductor G are adapted to deliver energy to a plurality of electric motors having armature windings A1 and A2 and field windings F1 and F2, through a line switch LS and a plurality of electrically controlled switches 2, 3 and 4 which are adapted to respectively short-circuit the resistors R2, R3 and R4.

The circuits for controlling the several switches LS, 2, 3 and 4 are governed by a master controller 9 which comprises a main rotatable drum 10 and an auxiliary drum 11. The main drum 10, which is adapted to be operated by a handle 13, embodies an upwardly projecting cylindrical portion 14, of somewhat smaller diameter than the main body portion and around which the auxiliary disk 11 is disposed. The disk 11 comprises two similar half units 15 which are resiliently held together on opposite sides by bolts 16 and springs 17, located within peripheral recesses 16ª, whereby a frictional engagement between the member 11 and a portion of the drum 10 is effected. The tension on the springs 17 may be varied to change the frictional resistance between the several members 14 and 15.

In order to limit the rotational movement of the frictionally driven disk 11, a projecting lug 18 is secured to the disk 11 and is adapted to engage the arms of a U-shaped stop 19 when moved in either direction and thus restrict the movement of the disk 11 to a sector which preferably corresponds to a single notch on the controller.

The main drum 10 is provided with a conducting segment 20 which as adapted to engage a plurality of stationary contact terminals 21 to 25, inclusive, along the position-indicating lines *a*, *b*, *c* and *d*, whereby the energizing circuits for the several electrically controlled switches LS, 2, 3 and 4 are established in the order mentioned.

The auxiliary disk 11 is preferably composed of suitable insulating material and is provided with a contact member 27 which is adapted to bridge a plurality of stationary contact terminals 28 and 29 in the first running position *a*, and thus to complete a main control circuit which extends from the supply-circuit conductor 1, through a portion of a control-resistor 31, a tap 30, and conducting segments 27 and 20 to the return-circuit conductor G.

If the main drum 10 of the master controller is moved by the handle 13 into position $a$, the auxiliary disk 11 and its contact member 27 will be moved with the main conducting segment 20, by reason of the frictional engagement between the members 10 and 11, until the disk 11 is stopped by the engagement of the lug 18 with the engaging member 19. In this position, the contact member 27 bridges the contact members 28 and 29, and the conducting segment 20 bridges contact terminals 21 and 22, thereby completing a circuit through the energizing coil of the line switch LS to the return-circuit conductor G. The switch LS is thus closed, and energy is supplied to the driving motors through a current-collecting device 36, conductor 42, switch LS, resistors R2, R3 and R4, armature winding A1, field winding F1, armature winding A2 and field winding F2 to the return-circuit conductor G. The driving motors are thus caused to accelerate in accordance with well understood principles.

In order to further accelerate the motors, the master controller 9 is moved successively into positions $b$, $c$, $d$ and $e$ in which the switches 2, 3 and 4 are successively closed to short-circuit the respective resistor units.

It will be understood that, after the auxiliary disk 11 has been moved to a position $a$, no further movement thereof can take place so long as the master controller is moved in a forward direction.

If the master controller 9 is moved in a reverse direction from any position, the frictional engagement between the main drum 10 and the auxiliary disk 11 will cause the disk 11 to be moved with the main drum until the stop 19 engages the member 18. It will be evident, therefore, that the segment 27 will be returned to the position shown in the drawing, and the main-control circuit for the switches LS, 2, 3 and 4 will be interrupted.

Although I have described my invention as embodied in an apparatus of very simple construction, it will be understood that the invention is not to be rstricted to the particular structure herein set forth and that only such limitations shall be imposed as are indicated in the appended claim.

I claim as my invention:

A controller comprising a main contact-carrying drum having a main cylindrical portion and a projecting cylindrical portion of smaller diameter than said main portion, an auxiliary contact-carrying drum comprising two coöperating semi-cylindrical parts each of a thickness equal to the difference between the radii of said cylindrical portions, a pair of bolts for connecting said semi-cylindrical parts together, a spring for each bolt adapted to cause continual frictional engagement between said main drum and said auxiliary drum, means for adjusting the tension of said springs, a projecting lug secured to said auxiliary drum, and a U-shaped stop member for engaging said lug to restrict the movement of said auxiliary drum relatively to said main drum.

In testimony whereof, I have hereunto subscribed my name this 25th day of Sept. 1916.

NORMAN W. STORER.